(12) United States Patent
Lee et al.

(10) Patent No.: US 9,354,358 B2
(45) Date of Patent: May 31, 2016

(54) LIGHT GUIDING LIQUID GLUE AND A TOUCH SENSITIVE DISPLAY USING THE SAME

(76) Inventors: Yuh-Wen Lee, Zhubei (TW); Qiong Yuan, Xinyu (CN); Xianbin Xu, Xiamen (CN)

(\*) Notice: Subject to any disclaimer, the term of this patent is extended or adjusted under 35 U.S.C. 154(b) by 0 days.

(21) Appl. No.: 13/593,498

(22) Filed: Aug. 23, 2012

(65) Prior Publication Data
US 2013/0057490 A1    Mar. 7, 2013

(30) Foreign Application Priority Data
Sep. 7, 2011  (CN) .......................... 2011 1 0270831

(51) Int. Cl.
*G02B 1/10* (2015.01)
*G06F 3/041* (2006.01)
(Continued)

(52) U.S. Cl.
CPC . *G02B 1/10* (2013.01); *B32B 37/12* (2013.01); *B32B 38/0008* (2013.01); *B32B 38/0036* (2013.01); *C09J 5/00* (2013.01); *C09J 9/00* (2013.01); *C09J 11/04* (2013.01); *C09J 11/08* (2013.01); *C09J 133/04* (2013.01); *G02B 1/04* (2013.01); *G06F 3/041* (2013.01); *G06F 3/0412* (2013.01); *B32B 2037/1253* (2013.01); *B32B 2037/1261* (2013.01); *B32B 2038/0052* (2013.01); *B32B 2307/20* (2013.01); *B32B 2307/40* (2013.01); *B32B 2307/412* (2013.01);
(Continued)

(58) Field of Classification Search
CPC ....... G06F 3/0412; G06F 3/044; G06F 3/045; G06F 2203/04102; G06F 2203/04103; G06F 3/041; G02B 1/04; G02B 1/10; C08L 63/00; C08L 33/08; C09J 133/04; C09J 11/04; C09J 11/08; C09J 5/00; C09J 9/00; B32B 2037/1253; B32B 2037/1261; B32B 2038/0052; B32B 2307/20; B32B 2307/40; B32B 2307/412; B32B 2310/0831; B32B 2315/00; B32B 2315/08; B32B 2333/04; B32B 2363/00; B32B 2457/208; B32B 37/12; B32B 38/0008; B32B 38/0036; C08K 2003/2227; C08K 2003/2237; C08K 2201/003; C08K 3/22; C08K 3/36
USPC ..................... 345/173–178; 178/18.03–18.11; 257/73–103; 156/275.7, 327, 330; 523/400, 457, 466; 524/430, 502, 556
See application file for complete search history.

(56) References Cited

U.S. PATENT DOCUMENTS 3,759,914 A * 9/1973 Simms et al. .................. 523/400
6,979,704 B1 * 12/2005 Mayer et al. .................. 523/220
(Continued)

FOREIGN PATENT DOCUMENTS

TW    I229306    3/2005
TW    M295044 U  8/2006

*Primary Examiner* — Dmitriy Bolotin

(57) ABSTRACT

A light guiding liquid glue and a touch sensitive display using the same are provided. The light guiding liquid glue includes a liquid glue and a plurality of light guiding particles dispersed in the liquid glue, wherein volume percent of the light guiding particles in the light guiding liquid glue ranges between 10% and 50%. The light guiding particles have a light scattering property, which can transfer a linear light into a flat light, and therefore the light guiding liquid glue of the present disclosure has a light guiding property. The touch sensitive display includes a display panel and a touch panel. The light guiding liquid glue is disposed between the display panel and the touch panel, which can transmit evenly lights emitted from the display panel to outside of the touch sensitive display.

13 Claims, 1 Drawing Sheet

(51) Int. Cl.
| | |
|---|---|
| *C09J 9/00* | (2006.01) |
| *C09J 11/04* | (2006.01) |
| *C09J 11/08* | (2006.01) |
| *G02B 1/04* | (2006.01) |
| *C09J 133/04* | (2006.01) |
| *B32B 37/12* | (2006.01) |
| *B32B 38/00* | (2006.01) |
| *C09J 5/00* | (2006.01) |
| *C08K 3/22* | (2006.01) |
| *C08K 3/36* | (2006.01) |

(52) U.S. Cl.
CPC ..... *B32B 2310/0831* (2013.01); *B32B 2315/00* (2013.01); *B32B 2315/08* (2013.01); *B32B 2333/04* (2013.01); *B32B 2363/00* (2013.01); *B32B 2457/208* (2013.01); *C08K 3/22* (2013.01); *C08K 3/36* (2013.01); *C08K 2003/2227* (2013.01); *C08K 2003/2237* (2013.01); *C08K 2201/003* (2013.01)

(56) References Cited

U.S. PATENT DOCUMENTS

| | | | |
|---|---|---|---|
| 7,626,176 B2* | 12/2009 | Zeitler et al. | 250/370.11 |
| 8,093,512 B2* | 1/2012 | Chen et al. | 174/523 |
| 8,134,540 B2* | 3/2012 | Kuo et al. | 345/174 |
| 2004/0119604 A1* | 6/2004 | Yu | 340/815.45 |
| 2007/0240914 A1* | 10/2007 | Lai et al. | 178/18.06 |
| 2008/0277588 A1* | 11/2008 | Zeitler et al. | 250/370.11 |
| 2009/0096765 A1* | 4/2009 | Kuo et al. | 345/174 |
| 2009/0321147 A1* | 12/2009 | Yeh et al. | 178/18.03 |
| 2009/0324163 A1* | 12/2009 | Dougherty et al. | 385/14 |
| 2010/0086264 A1* | 4/2010 | Kojima et al. | 385/98 |
| 2011/0012841 A1* | 1/2011 | Lin | 345/173 |
| 2011/0123722 A1* | 5/2011 | Yang et al. | 427/511 |
| 2012/0135247 A1* | 5/2012 | Lee et al. | 428/426 |
| 2012/0186855 A1* | 7/2012 | Lin | 174/250 |
| 2012/0188173 A1* | 7/2012 | Lin | 345/173 |
| 2012/0230630 A1* | 9/2012 | Dougherty et al. | 385/14 |
| 2012/0301678 A1* | 11/2012 | Tang et al. | 428/166 |

* cited by examiner

LIGHT GUIDING LIQUID GLUE AND A TOUCH SENSITIVE DISPLAY USING THE SAME

BACKGROUND OF THE INVENTION

This Application claims the benefit of the People's Republic of China Application No. 201110270831.7, filed on Sep. 7, 2011.

FIELD OF THE INVENTION

The present disclosure relates to a liquid glue, especially a liquid glue with a property of light guiding. The present disclosure further relates to a touch sensitive display using the liquid glue.

DESCRIPTION OF THE RELATED ART

In the recent years, touch sensitive displays have been widely used in various electronic products, for example in mobile phones, personal digit assistants, the palm-sized personal computers and so on. A touch sensitive display usually includes a touch panel and a display panel, wherein the touch panel is laminated with the display panel and the user can touch the figures displayed on the touch sensitive display so as to input information or manipulate the electronic products.

In traditional touch sensitive displays, a light guiding film is usually necessary for being laminated on the surface of the display panel and then the display panel is laminated with the touch panel via a liquid glue. However, the manufacturing process of laminating the light guiding film on the display panel necessitates use of rolling wheels and extrusion or the vacuum for lamination. This causes damages or remaining stress. The so-called remaining stress is liable to bring about a condition of inefficient lamination in subsequent application of the display panel being laminated with the touch panel via the liquid glue. Meanwhile, flowing speed of the liquid glue on the light guiding film is extremely slow, which generates air bubbles while being in motion and further causes poor lamination of the display panel and the touch panel.

In addition, a deaeration manufacturing process needs to be conducted after laminating the light guiding film, which makes the lamination process of the traditional touch display complex and time-consuming and influences the yield rates and the production capacity.

SUMMARY OF THE INVENTION

In view of the above disadvantages of existing mechanisms, the present disclosure designs a liquid glue with a property of light guiding, which is used to serve as an attaching medium between a display panel and a touch panel so as to omit the design of the light guiding film. The present disclosure also rectifies the problems of had damages on the display panel, remaining stress, and subsequent poor lamination process caused by the manufacturing process of the lamination of the light guiding film.

One embodiment of the present disclosure provides a light guiding liquid glue, including: a liquid glue and a plurality of the light guiding particles diffused in the liquid glue, wherein the light guiding particles are present in the liquid glue in proportion ranging from 10% to 50%. These light guiding particles with light scattering can convert linear light to flat light so as to make the liquid glue have a property of light guiding.

In addition, another embodiment of present disclosure provides a touch sensitive display, including: a display panel, a touch panel, and a light guiding liquid glue stated above being disposed between the display panel and the touch panel, wherein the light guiding liquid can transmit evenly the lights generated from the display panel.

In order to make above stated purposes, features and advantages of the present disclosure clearly understood, attached figures are coordinated to illustrate explicitly as follow.

DETAILED DESCRIPTION OF THE EMBODIMENTS

Figure 1:
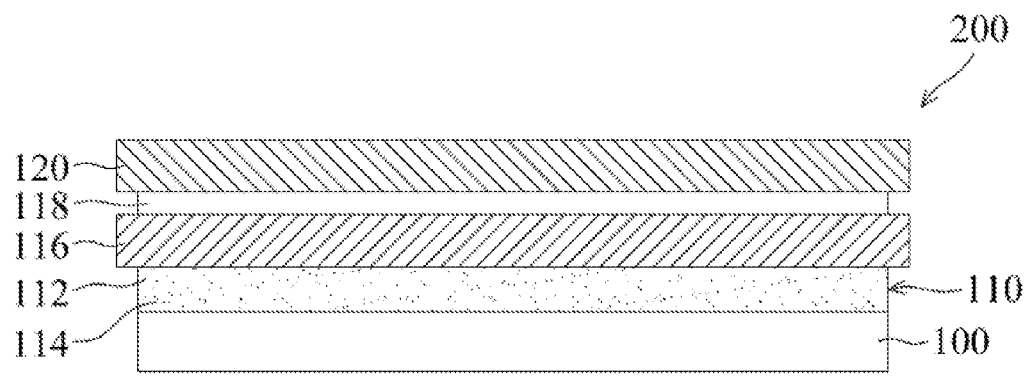
FIG. 1 is a cross-sectional scheme of an embodiment of a touch sensitive display according to the present invention.

Light guiding liquid glue in an embodiment of the present disclosure has light conductivity, adhesion, and mobility simultaneously, which is applicable for the manufacturing process of lamination of the liquid glue on a touch sensitive display. When the light guiding liquid glue is used to attach the display panel with the touch panel in the touch sensitive display, the light guiding film is no longer in the necessity of being laminated upon the surface of the display panel, as the result of which the bad damages on the display panel or the remaining stress will not exist.

At the same time, due to the light guiding liquid glue being directly coated on the display panel, flowing speed of the light guiding liquid glue on the display panel becomes faster than that of the liquid glue on the traditional light guiding film, and therefore the generation of air bubbles can be avoided and the quality of lamination between the display panel and the touch panel can be enhanced.

Moreover, compared to the lamination manufacturing process of the traditional touch sensitive display, when the light guiding liquid glue of the present disclosure is used to conduct the manufacturing process of the lamination of the display panel and the touch panel, the steps of laminating the light guiding film and deaeration can be omitted so as to simplify the lamination manufacturing process of the touch sensitive device and shorten its corresponding time and thus effectively enhance the yield rate and the production capacity.

In an embodiment, the light guiding liquid glue comprises a liquid glue and a plurality of light guiding particles diffused in the liquid glue, wherein the volume percent of the light guiding particles in the light guiding liquid glue ranges from 10% to 50%. Actually in the design of the proportion, the present disclosure mainly focuses on the demands of fitting light conductivity and transparent visibility simultaneously.

In an embodiment, the liquid glue can be a liquid optical glue, wherein material of the liquid glue could be one or more of an acrylic high-polymer, an acrylic resin or epoxy resin or similar high-polymer material. The acrylic high-polymer refers to a substance that is copolymerized by methyl acrylate, ethyl acrylate, butyl acrylate or other acrylates. The epoxy resin can be a radical epoxy resin, two-component epoxy resin or a double-cationic epoxy resin.

The light guiding particles refer to particles with a property of light scattering, wherein diameter of every light guiding particle can be between 30 nm and 5 μm. The light guiding particles can be made by inorganic transparent materials and/or organic transparent materials, such as SiO2, Al2O3, TiO2, glass powders and transparent resin particles.

Light guiding particles can be evenly diffused in the liquid glue by means of mixing directly, stirring, abrading, extruding with triaxial rolling and scattering with ultrasonic vibration so as to form the light guiding liquid glue of the embodiment of the present disclosure. The light guiding particles in the light guiding liquid glue can convert linear light into flat light in order to reach the light guiding effect.

In addition, the so-called locations, "above" and "below", in the specification are only used to express relative position relations. As for the figures in the specification, the above position of the touch sensitive display is relatively close to a user, while the below is far away from the user.

Referring to FIG. 1, a cross-sectional scheme of an embodiment of a touch sensitive display is illustrated. The touch sensitive display 200 includes a display panel 100 and a touch panel 116. The display panel 100 could be designed, for example, as liquid crystal display (LCD) panel or other display components. The touch panel 116 could be designed, for example, as a capacitive touch panel or other types of touch panel.

According to the present embodiment, the light guiding liquid glue 110 is comprehensively and directly coated on a surface of the display panel 100, which surface such as the upper surface shown in FIG. 1 is used for reflecting, lights. The touch panel 116 can further be laminated to the above of the display panel 100 by permeating the light guiding liquid glue 110. The light guiding liquid glue 110 is comprises a plurality of light guiding particles 114 being evenly diffused in a liquid glue 112. The light guiding particles 114 have a property of light scattering and can convert linear lights into flat lights, and therefore, the light guiding liquid glue 110 can not only attach the display panel 100 to the touch panel 116, but also further let the lights emitted by the display panel 100 transmit evenly.

Therefore, based on the touch sensitive display 200 of the present embodiment, the light guiding film is not needed for being laminated on the surface of the display panel 100, and the light guiding liquid glue 110 directly serves as an attachment medium between the display panel 100 and the touch panel 116 to simultaneously reach the effects of light conductivity and attachment.

Next, consolidation of the light guiding liquid glue 110 is necessary to be performed after laminating the touch panel 116 to the display panel 100 by means of the light guiding liquid glue 110. The light guiding liquid glue 110, in accordance with the diversity of types of the liquid glue 112 in the actual realization, can be solidified by means of ultraviolet lights, heat, moisture, anaerobic ways, and two-component ways.

Moreover, the touch sensitive display 200 also includes a cover lens 120 laminated to the upper surface of the touch panel 116, which is used to provide the touch sensitive display 200 with support and protection. The cover lens. 120 can be laminated to the touch panel 116 by using an adhesive layer 118. Additionally, the cover lens 120 could be designed as a transparent glass substrate and then the transparent glass substrate can be processed through one or more of strengthening, bacteria-resisting, glare-resisting; and the adhesive layer 118 could be liquid glue or other adhesive glues.

For supplementary explanations, the above relevant description of the manufacturing process is only convenient for describing the architecture of the touch sensitive display 200 and not used for limitation of the present disclosure. The present embodiment further refers to an example of cover lens 120 being laminated to the upper surface of the touch panel 116 and then using the light guiding liquid glue 110 to attach the touch panel 116 covered by cover lens 120 to the above of the display panel 100.

Figure 2:
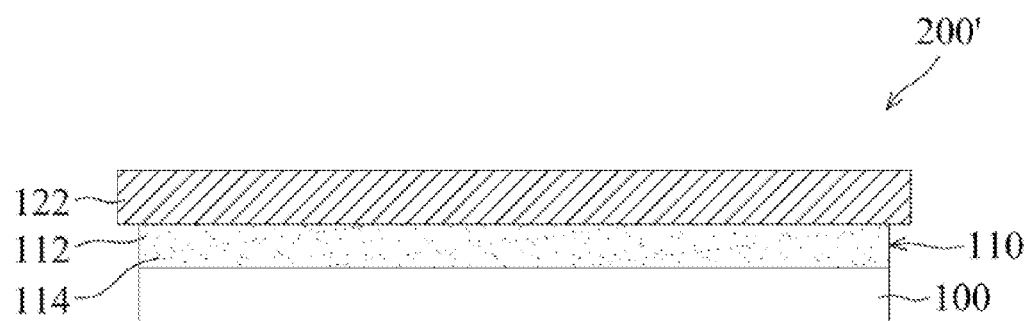
FIG. 2 is a cross-sectional scheme of another embodiment of the touch sensitive display according to the present invention.

Please referring to FIG. 2, a cross-sectional scheme of another embodiment of the touch sensitive display according to the present disclosure is illustrated. The architecture and the design of the touch sensitive display 200' of the present embodiment correspond to that of the embodiment of FIG. 1. The touch sensitive display 200' includes a display panel 100 and a touch panel 122, and a lamination between the display panel 100 and the touch panel 122 can be performed by permeating directly the light guiding liquid glue 110. In an embodiment, the touch panel 122, apart from being used for sensing touches, can also act as a protective layer for the touch sensitive display 200', which can provide the desired support and protection. In other words, substrate of the touch panel 122 can be processed by strengthening, bacteria-resisting, glare-resisting to form sensor electrode arrays (not shown) that are used for sensing touch points.

The touch display 200' of FIG. 2, compared to the touch sensitive display 200 of FIG. 1, can reduce the setting of a piece of cover lens 120 to make the thickness of the integral touch sensitive display 200' thin and reduce the manufacturing step of laminating the cover lens 120 with the touch panel 116 via the adhesive layer 118.

Summarized from the above, light guiding liquid glue of present disclosure can substitute light guiding film of the traditional touch sensitive display and the liquid glue for laminating the light guiding film to the display panel. Therefore, the display panel of the touch sensitive display of the present display need not be laminated with the light guiding film, and the touch panel can be laminated to the touch panel directly by permeating, the light guiding liquid glue.

Therefore, the touch sensitive display of the present invention can avoid generating problems of had damages on the display panel or remaining stress caused by laminating the light guiding film. Meanwhile, good mobility of the light guiding liquid glue coated directly on the display panel can avoid production of air bubbles and enhance quality of lamination between the display panel and the touch panel.

In addition, compared to the manufacturing process of lamination in traditional touch display, manufacturing process of the touch sensitive display of the present disclosure can omit the steps of laminating the light guiding film and deaeration to simplify the manufacturing process of the touch sensitive display and shorten its time, thus effectively improving the production yield and volume of the touch sensitive displays.

In addition, as the light guiding film is not necessary to be laminated on the display panel in the present disclosure, problems such as remaining stress do not exist, which results in improved quality of laminating, cover lens on the lateral side of the touch panel.

Even though preferred embodiments are disclosed above, it would be appreciated that the embodiments are not construed as limitations in any manner. Anyone who is familiar with the skills can make modest alterations and modifications if not getting, away from the spirit and scope of the invention. Therefore, the scope of the present disclosure should regard the definition of the claim of the present invention.

What is claimed is:
1. A touch sensitive display, including:
   a display panel;
   a touch panel; and
   a light guiding liquid glue comprising a liquid glue and a plurality of light guiding particles diffused in the liquid glue and the light guiding liquid clue having a light guiding property such that the light guiding particle evenly distributed in the light guiding liquid glue;

wherein the light guiding liquid glue is disposed between the display panel and the touch panel; and wherein the light guiding particles have a property of light scattering and converting linear lights into flat lights for increasing scattering.

2. The touch sensitive display according to claim 1, wherein the light guiding liquid glue is directly disposed on the display panel.

3. The touch sensitive display according to claim 1, wherein the light guiding particles of the light guiding liquid glue are used for evenly transmitting lights sent by the display panel to outside of the touch sensitive display.

4. The touch sensitive display according to claim 1, further comprising a cover lens laminated on an upper surface of the touch panel.

5. The touch sensitive display according to claim 1, wherein the touch panel further serves as a panel used for support and protection.

6. The touch sensitive display according to claim 1, wherein volume percent of the light guiding particles in the light guiding liquid glue ranges from 10% to 50%.

7. The touch sensitive display according to claim 1, wherein material of the light guiding particles comprises one or more of organic transparent material or inorganic transparent material.

8. The touch sensitive display according to claim 1, wherein diameter of the light guiding particle is between 30 nm and 5 μm.

9. The touch sensitive display according to claim 1, wherein material of the light guiding particles is selected from a group consisting of aluminum oxide and titanium dioxide.

10. The touch sensitive display according to claim 1, wherein diameter of the light guiding particle is about 5 μm.

11. The touch sensitive display according to claim 1, wherein material of the liquid glue comprises one or more of acrylic high-polymer; and acrylate resin.

12. The touch sensitive display according to claim 11, wherein the acrylic high-polymer comprises a substance copolymerized by one or more of methyl acrylate, ethyl acrylate, and butyl acrylate.

13. The touch sensitive display according to claim 1, wherein the light guiding liquid glue is solidified by means of ultraviolet lights, moisture or anaerobic ways.

* * * * *